United States Patent Office 3,546,255
Patented Dec. 8, 1970

3,546,255
FURAN-2,5-DICARBOXYLIC ACID DIAMIDES
Max Duennenberger, Frenkendorf, and Max Schellenbaum, Muttenz, Switzerland, assignors to Ciba Limited, Basel, Switzerland, a company of Switzerland
No Drawing. Filed Feb. 13, 1968, Ser. No. 705,011
Claims priority, application Switzerland, Feb. 20, 1967, 2,415/67
Int. Cl. C07d 5/14
U.S. Cl. 260—347.3                     6 Claims

ABSTRACT OF THE DISCLOSURE

The present invention relates to novel furan-2,5-dicarboxylic acid diamides and their use in preparations for combating harmful bacteria. These furan-2,5-dicarboxylic acid diamides are particularly valuable because of their broad antibacterial activity spectrum. Thus they may be used in bacterial control quite generally.

The present invention provides preparations for combating harmful bacteria, containing as active ingredient at least one furan-2,5-dicarboxylic acid diamide of the formula (1) 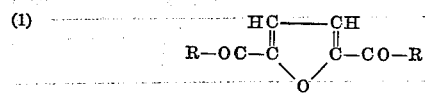

in which R is the residue of an aminobenzene linked with the carbonyl group through the nitrogen atom, which carries on the benzene nucleus at least one further substituent in the form of a halogen atom or of a trifluoromethyl group.

Preferred compounds are furan-2,5-dicarboxylic acid diamides of the formula (2) 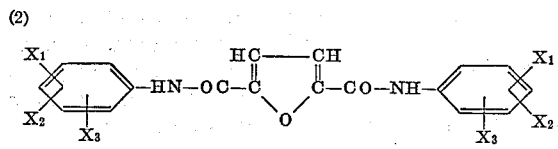

in which $X_1$ represents a hydrogen or halogen atom, $X_2$ is a hydrogen or halogen atom or a trifluoromethyl group and $X_3$ stands for a halogen atom or a trifluoromethyl group.

Specially valuable among these compounds are furan-2,5-dicarboxylic acid diamides of the formula (3) 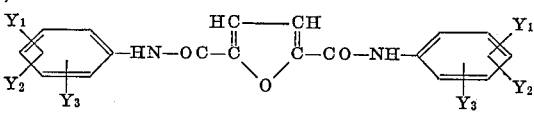

in which $Y_1$ stands for a hydrogen, bromine or chlorine atom, $Y_2$ for a hydrogen, bromine or chlorine atom or a trifluoromethyl group and $Y_3$ for a trifluoromethyl group or for a bromine or chlorine atom.

Of importance are furan-2,5-dicarboxylic acid diamides of the formula (4) 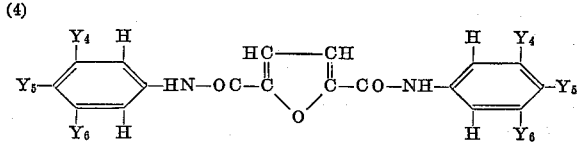

in which $Y_4$ to $Y_6$, independently of each other, are hydrogen, bromine or chlorine atoms or trifluoromethyl groups, at least one and at most two of the symbols $Y_4$ to $Y_6$ representing hydrogen atoms.

Of special value is the compound of the formula (5) 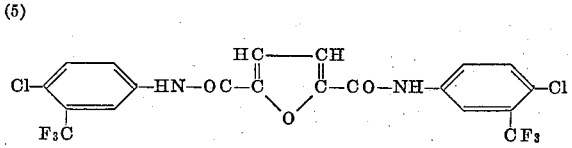

The compounds of the Formula 1 are obtained by reacting a furan-2,5-dicarboxylic acid dihalide with a compound of the formula R—H, in which R has the above meaning.

Preparations for combating harmful bacteria containing a compound of the Formula 1 may be prepared and used in the known manner. A particularly valuable feature of the new preparations is their broad antibacterial activity spectrum, including both Gram-positive and Gram-negative bacteria. Insofar as the application of the new compounds of the Formula 1 is concerned the absence of odours and colours in them is of special value. Thus, the present invention includes also their use in bacterial control quite generally. They may be used on a very broad basis, especially for protecting organic substrates from infestation by destructive and pathogenic bacteria. The compounds of the Formula 1 are, accordingly, suitable for use as preservatives and disinfectants for textile materials and technical products of all descriptions, in veterinary medicine and in cosmetics.

From among technical products that can be preserved with the aid of compounds of the Formula 1 there may be mentioned as random examples: textile dressing and improving agents, glues, binders, paints, dyeing and printing pastes and similar preparations based on organic or inorganic dyestuffs or pigments, including those which incorporate casein or other organic compounds. Wall and ceiling paints, for example those containing a proteinic dyestuff binder, are likewise protected by an addition of the new compounds from infestation by bacteria.

Furthermore, compounds of the Formula 1 may be used for preserving and disinfecting dressings on fibres and textile materials; they may be applied both to natural and synthetic fibres and produce on them a durable effect against harmful (including pathogenic) bacteria. This addition may be made before, during or after a treatment of the said textile materials with other substances, for example dyeing or printing pastes, dressings or the like.

Textile materials treated in this manner are also protected from the appearance of body odour (perspiration) caused by bacteria.

Compounds of the Formula 1 may also be used as preservatives in the cellulose and paper industries, inter alia for preventing the known slime formation caused by bacteria in paper-making machines.

Furthermore, by combining compounds of the Formula 1 with detergents or surface-active substances there are obtained washing and cleansing preparations having an excellent antibacterial effect. These compounds may be incorporated, for example, with soaps or combined with soap-free detergents or surface-active substances or with mixtures of soaps and soap-free detergents, and in such combinations their antibacterial activity is fully retained.

Cleansing agents containing compounds of the Formula 1 may be used in industry or in the home, also in the food industry, for example in dairies, breweries and abattoirs. The compounds of the Formula 1 may also be used as ingredients of preparations used for cleaning and disinfecting.

Their activity may also be utilized in preserving and disinfecting dressings on plastics. When plasticizers are used it is advantageous to add the compound of the Formula 1 to the plastic material in the form of a solution or dispersion in the plasticizer. It is advantageous to ensure that the compound is distributed as evenly as possible in the plastic. Plastics having antibacterial properties may be used for making utilitarian articles of a wide variety which are desired to have an antibacterial activity, for example in doormats, bathroom curtains, seats, treads in swimming baths and wall coverings. By incorporating them with wax and polishing compositions there are obtained floor and furniture polishes having a disinfecting activity.

The compounds of the Formula 1 may be applied to the textile materials to be protected in various ways, for example by impregnation or spraying with solutions or suspensions containing the said compounds as active ingredient. The content of active substance may range, according to the intended use, from 1 to 30 g. of active substance per litre of treatment liquor. In most cases textile materials of synthetic or natural origin are sufficiently protected from bacterial infestation by a content of 0.1 to 3% of active substance. The active substance may be used in combination with other textile dressings such as finishes, anticrease dressings or the like.

The forms of application may be similar to the usual formulations of pest control, for example preparations containing compounds of the Formula 1 may also contain additives such as vehicles, solvents, diluents, dispersants, wetting agents, adhesives and the like, and also other pest control agents, for example fungicidal or fungistatic substances.

DETERMINING THE MINIMAL INHIBITORY CONCENTRATION (MIC) AGAINST BACTERIA

The MIC (minimal inhibitory concentration) is determined by a method adapted from the standard specifications, which affords an approximation to the absolute minimal inhibitory values of an active substance.

The test organisms used were *Staphylococcus aureus* and *Streptococcus mitis*.

The minimal inhibitory concentration against *Staphylococcus aureus* is determined by the dilution test and against *Streptococcus mitis* by the gradient plate test.

| Compounds of formula No. (see Table I)— | Minimal inhibitory concentration (MIC) in parts per million, in the bacteriostatic test against | |
|---|---|---|
| | *Staphylococcus aureus* | *Streptococcus mitis* |
| 5 | 0.1 | |
| 9 | 0.1 | 1 |
| 11 | 1 | |

Unless otherwise indicated, parts and percentages in the following manufacturing instruction and in the examples are by weight.

EXAMPLE 1

A mixture of 7.8 parts of furan-2,5-dicarboxylic acid, 60 parts of thionylchloride and 0.1 part of dimethylformamide is stirred for 1 hour under reflux. The thionylchloride is then distilled off and the furan-2,5-dicarboxylic acid dichloride (melting at 76–77° C.) is dissolved in 150 parts of chlorobenzene and mixed at 40 to 50° C. with 17.2 parts of p-bromaniline whereupon a precipitate forms. 9 parts of pyridine are then dropped in within 30 minutes at 70 to 80° C. and the batch is stirred for another hour at the same temperature and then poured over ice. The reaction mixture is subjected to steam distillation, the colourless crystal magma is suctioned off, washed with 3×100 parts of water, and dried, to furnish 21 parts of the compound of the Formula 6 in Table I.

After 2 recrystallizations from aqueous dimethylformamide and the analytically pure product melts at 320–321° C.

In a similar manner the compounds of the Formulae 5 and 7 to 17 are obtained:

In the same manner specimens of 100 g. of wool cheviot are treated.

| No. | Formula | M.P. °C. | Calculated C | Calculated H | Calculated N | Found C | Found H | Found N |
|---|---|---|---|---|---|---|---|---|
| 5 | Cl–C$_6$H$_3$(CF$_3$)–NH–OC–C(=)–O–C(=)–CO–NH–C$_6$H$_3$(CF$_3$)–Cl (epoxide) | 152–152 | 47.29 | 2.93 | 7.19 | 47.13 | 2.79 | 7.15 |
| 6 | Br–C$_6$H$_4$–NH–OC–C(=)–O–C(=)–CO–NH–C$_6$H$_4$–Br | 320–321 | 46.58 | 2.61 | 6.04 | 46.37 | 2.75 | 6.35 |
| 7 | 3,4,5-Cl$_3$–C$_6$H$_2$–NH–CO–C(=)–O–C(=)–CO–NH–C$_6$H$_2$–Cl$_3$ | 283–284 | 42.14 | 1.57 | 5.46 | 42.37 | 1.49 | 5.42 |
| 8 | 3,4-Cl$_2$–C$_6$H$_3$–HN–OC–C(=)–O–C(=)–CO–NH–C$_6$H$_3$–Cl$_2$ | 292.5–23 | 48.69 | 2.27 | 6.31 | 48.63 | 2.36 | 6.04 |
| 9 | 3,5-(CF$_3$)$_2$–C$_6$H$_3$–HN–OC–C(=)–O–C(=)–CO–NH–C$_6$H$_3$–(CF$_3$)$_2$ | 278–279 | 45.68 | 1.74 | 4.84 | 45.91 | 1.81 | 5.04 |
| 10 | 4-Cl-3-CF$_3$–C$_6$H$_3$–HN–OC–C(=)–O–C(=)–CO–NH–C$_6$H$_3$–CF$_3$-Cl | 254–255 | 46.99 | 1.97 | 5.48 | 47.11 | 2.15 | 5.18 |
| 11 | 3-CF$_3$–C$_6$H$_4$–HN–OC–C(=)–O–C(=)–CO–NH–C$_6$H$_4$–CF$_3$ | 180–1.1 | 54.31 | 2.73 | 6.33 | 54.20 | 2.53 | 6.35 |
| 12 | 2-CF$_3$–C$_6$H$_4$–HN–OC–C(=)–O–C(=)–CO–NH–C$_6$H$_4$–CF$_3$ | 167–168 | 54.31 | 2.73 | 6.33 | 54.45 | 2.75 | 6.27 |
| 13 | 4-CF$_3$–C$_6$H$_4$–HN–OC–C(=)–O–C(=)–CO–NH–C$_6$H$_4$–CF$_3$ | 279–280 | 54.31 | 2.73 | 6.33 | 54.16 | 2.73 | 6.52 |
| 14 | 2-Cl–C$_6$H$_4$–HN–OC–C(=)–O–C(=)–CO–NH–C$_6$H$_4$–Cl | 197–198 | 57.62 | 3.22 | 7.47 | 57.67 | 3.05 | 7.44 |
| 15 | 3-Cl–C$_6$H$_4$–HN–OC–C(=)–O–C(=)–CO–NH–C$_6$H$_4$–Cl | 194–195 | 57.62 | 3.22 | 7.47 | 57.72 | 3.25 | 7.46 |
| 16 | 4-Cl–C$_6$H$_4$–HN–OC–C(=)–O–C(=)–CO–NH–C$_6$H$_4$–Cl | 289–290 | 57.62 | 3.22 | 7.47 | 57.26 | 3.30 | 7.38 |
| 17 | 2,4-Cl$_2$–C$_6$H$_3$–HN–OC–C(=)–O–C(=)–CO–NH–C$_6$H$_3$–Cl$_2$ | 241–242 | 48.68 | 2.27 | 6.31 | 48.67 | 2.45 | 6.34 |

All structures contain the central epoxysuccinic-bis-anilide unit:

$$\text{Ar–NH–CO–CH}\underset{\underset{\displaystyle O}{\diagdown\diagup}}{\text{—}}\text{CH–CO–NH–Ar}$$

EXAMPLE 2

Specimens of 100 g. of cotton creton are impregnated at 20° C. on a padder with a 0.1% solution of the compound of Formula 5 and then expressed to a weight increase of 100%.

The fabrics are dried at 30 to 40° C. and contain 0.1% of active substance referred to their own weight.

To test the antibacterial effect round blanks of the impregnated fabrics of 10 mm. diameter (one half after 24 hours' immersion in water at 29° C. and the other without such immersion) are placed on glucose agar plates previously inoculated with *Staphylococcus aureus*. The plates are then incubated for 24 hours at 37° C.

The evaluation of these tests extends to the inhibitory zone [IZ in mm.] around the round blanks and to the growth [G percent] found microscopically underneath the round blanks:

| Substrate (with 0.1% of active substance) | Without immersion in water | | With immersion in water | |
|---|---|---|---|---|
| | IZ, mm. | G, percent | IZ, mm. | G, percent |
| Cotton | 2 | 0 | 1 | 0 |
| Wool | 2.5 | 0 | 1 | 0 |

Similar results are obtained when the compound of the Formula 5 is replaced by the compound of the Formula 6, 7 or 11.

EXAMPLE 3

To manufacture an antibacterial soap in cake form 1.2 g. of the compound of the Formula 9 are added to a mixture of

|  | G. |
|---|---|
| Basic soap in flake form | 120 |
| Disodium salt of ethylenediamine-tetraacetic acid (dihydrate) | 0.12 |
| Titanium dioxide | 0.24 |

The soap chips formed by rolling are powdered in a high-speed stirrer and then compressed in cake form.

With this antibacterial soap a solution each of 5% and 1.5% strength in sterile tap water is prepared. 1 ml. each of these solutions is added to 4 ml. of sterile brain heart infusion broth. By continuous dilution to one tenth of the preceding solution two series are obtained which on combination furnish the following continuous dilution series: 100, 30, 10, 3, 1 . . . parts per million of active substance.

The solutions are inoculated with the bacterium *Staphylococcus aureus* and incubated for 24 hours at 37° C. After this time 0.05 ml. is taken out of each solution with a pipette and poured over brain heart infusion slant-agar. The agar tubes are incubated for another 24 hours at 37° C., and the minimal lethal concentration is then determined: Bactericidal test (24 hours): Effect against *Staphylococcus aureus*, 30 parts per million.

A similar lethal concentration is obtained when the compound of the Formula 9 is replaced by the compound of the Formula 5 or 11.

EXAMPLE 4

A paste of 100 parts of polyvinylchloride, 59 parts by volume of dioctylphthalate and 2 parts of the compound of the Formula 5 is rolled to and fro on a calender at 150° C. to form a foil 1 mm. thick. Round blanks of 10 mm. diameter are cut out of the foil and placed on glucose-agar plates previously inoculated with *Staphylococcus aureus*. After 24 hours' incubation at 37° C. the inhibitory zone around the round blanks (IZ in mm.) and the growth (G percent) underneath the round blanks, identifiable under a microscope, are determined.

The table lists the results obtained without stability test (without watering) and after watering for 24 hours at 29° C.

Without watering:
  IZ (mm.) _____ Trace
  G (percent) _____ 0
After watering:
  IZ (mm.) _____ 0
  G (percent) _____ 0

Similar results are obtained when the compound of the Formula 5 is replaced by the compound of the Formula 9 or 11.

We claim:
1. A furan-2,5-dicarboxylic acid diamide of the formula

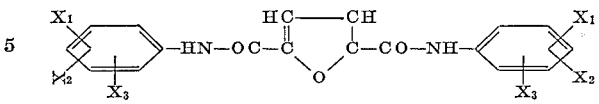

in which $X_1$ represents a hydrogen or halogen atom, $X_2$ is a member selected from the group consisting of a hydrogen atom, a halogen atom and a trifluoromethyl group and $X_3$ stands for a halogen atom or a trifluoromethyl group.

2. A furan-2,5-dicarboxylic acid diamide according to claim 1 of the formula

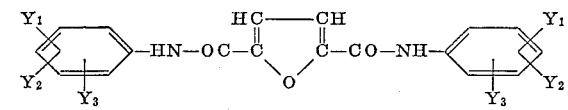

in which $Y_1$ represents a member selected from the group consisting of a hydrogen atom, a bromine atom and a chlorine atom, $Y_2$ represents a member selected from the group consisting of a hydrogen atom, a bromine atom, a chlorine atom and a trifluoromethyl group, and $Y_3$ stands for a member selected from the group consisting of a trifluoromethyl group, a bromine atom and a chlorine atom.

3. A furan-2,5-dicarboxylic acid diamide according to claim 1 of the formula

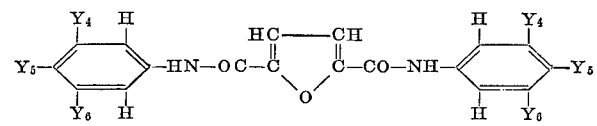

in which $Y_4$ to $Y_6$ independently of each other, represent a member selected from the group consisting of a hydrogen atom, a bromine atom, a chlorine atom and a trifluoromethyl group, at least one of the symbols $Y_4$ to $Y_6$ representing hydrogen atoms.

4. Furan-2,5-dicarboxylic acid diamide according to claim 1 of the formula

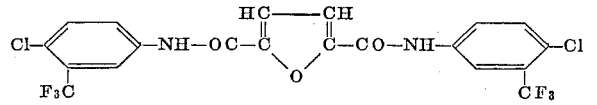

5. Furan-2,5-dicarboxylic acid diamide according to claim 1 of the formula

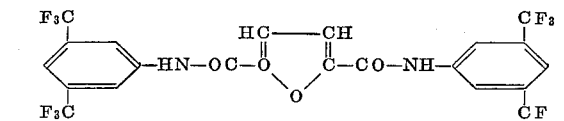

6. Furan-2,5-dicarboxylic acid diamide according to claim 1 of the formula

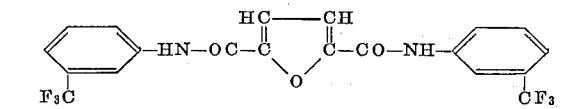

References Cited

UNITED STATES PATENTS 2,317,286   4/1943   Martin et al. _____ 260—347.3

ALEX MAZEL, Primary Examiner

B. I. DENTZ, Assistant Examiner

U.S. Cl. X.R.

424—285